March 3, 1964  R. A. ANDREWS ETAL  3,123,114
FRUIT AND VEGETABLE PEEL-CHIPPING APPARATUS
Filed Oct. 8, 1962  3 Sheets-Sheet 1

RICHARD A. ANDREWS
DONN J. RICKARD
MEREDITH J. STANSBARY
INVENTORS

BY

ATTORNEYS

March 3, 1964

R. A. ANDREWS ETAL 3,123,114

FRUIT AND VEGETABLE PEEL-CHIPPING APPARATUS

Filed Oct. 8, 1962

RICHARD A. ANDREWS
DONN J. RICKARD
MEREDITH J. STANSBARY
*INVENTORS*

BY *Lyon & Lyon*

ATTORNEYS

March 3, 1964 R. A. ANDREWS ETAL 3,123,114
FRUIT AND VEGETABLE PEEL-CHIPPING APPARATUS
Filed Oct. 8, 1962 3 Sheets-Sheet 3

RICHARD A. ANDREWS
DONN J. RICKARD
MEREDITH J. STANSBARY
*INVENTORS*

BY *Lyon+Lyon*

ATTORNEYS

United States Patent Office 3,123,114
Patented Mar. 3, 1964

3,123,114
FRUIT AND VEGETABLE PEEL-CHIPPING
APPARATUS
Richard A. Andrews, Whittier, Donn J. Rickard, Glendora, and Meredith J. Stansbary, La Habra, Calif., assignors to Citrus Equipment Corporation, Whittier, Calif., a corporation of California
Filed Oct. 8, 1962, Ser. No. 229,147
10 Claims. (Cl. 146—3)

This invention relates to the processing of fruits and vegetables and has particular reference to an apparatus for removing thin chips from the surfaces of objects such as citrus fruit, and to a process for the recovery of citrus oil from the peel of citrus fruit. This application is a continuation-in-part of our copending application Serial No. 57,002 filed September 19, 1960, now abandoned.

A primary object of the present invention is to provide a novel apparatus particularly adapted to the removal of thin chips or flakes from fruits, vegetables and the like.

A further object of the present invention is to provide a novel apparatus and a method for the recovery of citrus oil from the peel of whole citrus fruits.

Citrus peel oil is an extremely valuable commodity and many attempts have heretofore been made to produce a machine capable of automatically extracting the peel oil from the fruit. While certain of these attempts have been commercially successful from the standpoint of recovery of a satisfactory product, they are all subject to one or more drawbacks such as low yields, due to inefficient processing and exposure of the oil to the atmosphere, high cost, relatively low speeds of operation, high water use requirements, contamination of the oil or the juice, and the requirement for careful orientation of the peel prior to introduction to the peel oil isolation apparatus. Other attempts have not been entirely successful due to vigorous pressing operations which produce a peel oil of undesirably dark color. An important object of this invention is, therefore, to provide a novel apparatus and process for the production of citrus peel oil which is not subject to the disadvantages of those heretofore proposed or used.

Another object of the present invention is to provide a novel apparatus for operating upon whole citrus fruit to cutting thin chips from the skins thereof and particularly a portion or all of the flavedo layer of the skins or peels, which chips can be used as such or easily operated upon to remove the citrus peel oil without the requirement for pressing operations thereupon.

Another object of the present invention is to provide a novel process and apparatus for the removal of all or a portion of the flavedo layer of whole citrus fruit, leaving the fruit in a clean and sanitary condition for juice extracting or other processing.

A further object of the present invention is to provide a novel apparatus and process for the high speed, high yield production of citrus peel oil of extremely high quality.

Other objects and advantages of the present invention, it is believed, will be readily apparent from the following detailed description of a preferred embodiment thereof when read in connection with the accompanying drawings.

FIGURE 6 is a plan view of a single chip cut from the peel of a citrus fruit in accordance with the present invention, illustrating the lacy appearance of the chip, the holes comprising oil sacs which have been cut through.

Figure 1:
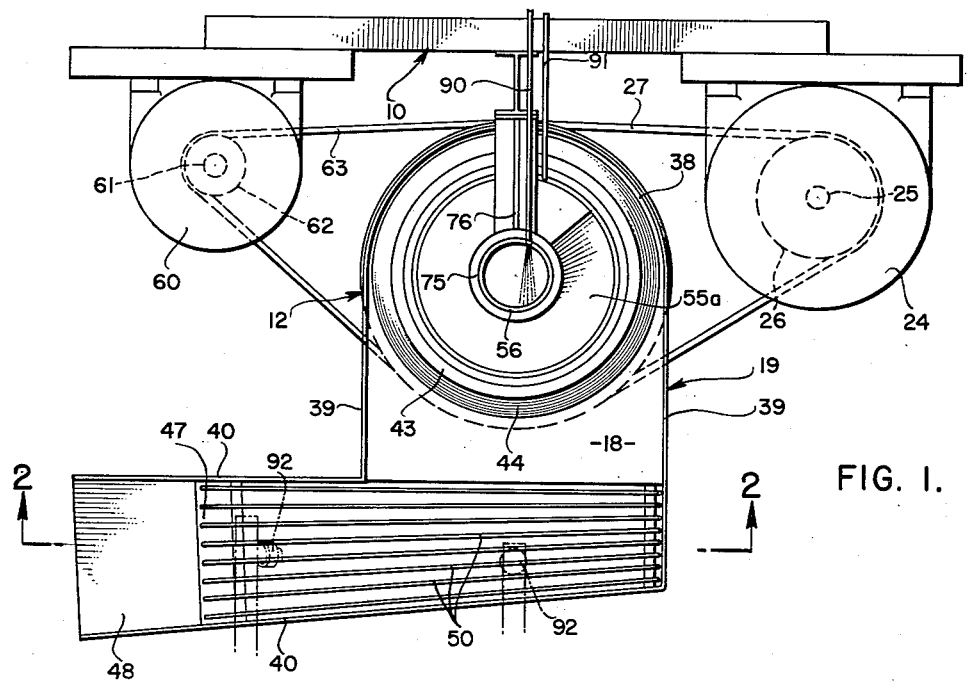
FIGURE 1 is a top plan view of the apparatus of the present invention.

Referring now to the drawings, the apparatus of the present invention includes a framework generally indicated 10, supported on legs 11. Secured to framework is a generally cylindrical housing 12, preferably formed of a pair of generally semi-circular walls 13, fitting within the cylindrical side walls 15 of a housing bottom member 16. One of the members 13 has a diameter slightly smaller than the other so that access to any portion of the interior of the housing may be readily obtained by moving one of the members 13 relative to the other in a circumferential direction. The top of the housing is provided by an annular member 17 secured to the bottom 18 of a pan 19.

Figure 3:
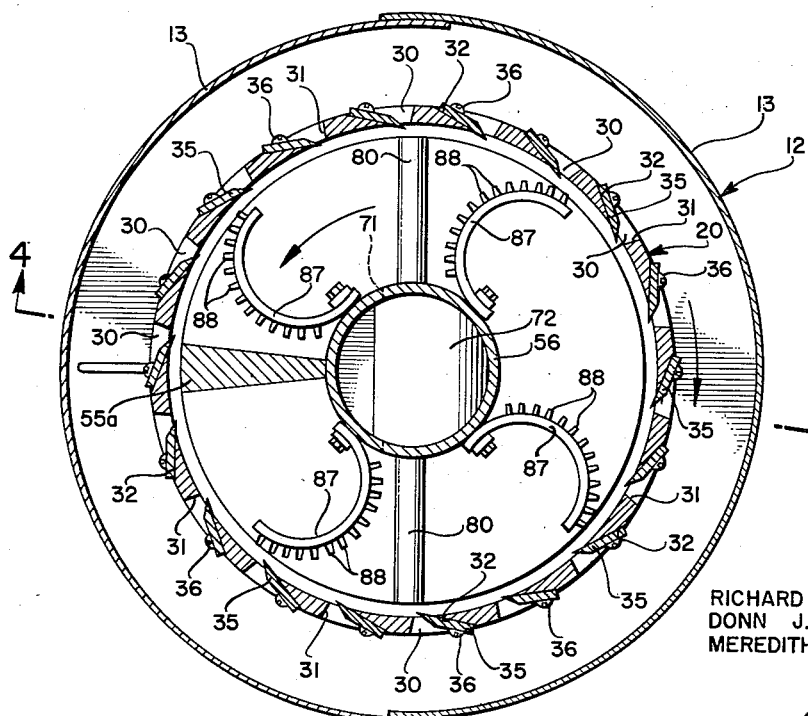
FIGURE 3 is an enlarged sectional elevation taken substantially on the line 3—3 of FIGURE 2.

Closely fitting within the annular member 17 is a knife cylinder 20 having a closed bottom 21 integral with a hollow shaft 22 which extends through a bearing 23 secured to the framework, the shaft being supported on thrust bearings (not shown). Means are provided for turning the shaft 22 in the direction of the arrow of FIGURE 3, and as shown, these means may comprise a motor 24 mounted on the framework, the motor shaft 25 carrying a pulley 26 connected by belts 27 to a pulley 28 keyed to the lower end of the shaft 22. The cylinder 20 is provided with a plurality of longitudinal, spaced slots 30 extending substantially the entire length thereof. The leading edge 31 of each slot is inclined at a slight angle from the radial outwardly in the direction of rotation. The trailing edge 32 of each slot is inclined rearwardly of the direction of rotation at a relatively large angle to the radial, and a knife blade 35 is secured to each of said trailing edges by means of a plurality of screw members 36. The knife blades are so positioned that the sharpened edges thereof extend slightly inward of the inside wall of the cylinder 20, the blade edge-definfiing surfaces pointing generally in the direction of rotation of the cylinder 20.

As seen in FIGURE 1, the pan 19 is generally L-shaped in plan, having generally semi-circular walls 38 merging into parallel vertical side wall portions 39. The walls 39 are connected to generally vertical side walls 40 which lead downwardly and away from the walls 39. The upper end of the cylinder 20 is open and extends through an opening 42 in the bottom 18 of the pan and is provided with a flange member 43 having a downwardly-inclined outer portion 44.

The pan bottom 18 merges into a bottom wall 45 which leads to a liquid outlet tube 46. A pan wall portion 47 extends above the tube 46 and is connected to a secondary bottom wall 48. A grid member composed of a plurality of spaced wires 50 extends from the wall 38 to the wall 47 on substantially the same level as the secondary bottom wall 48.

Mounted for rotation with, but in a direction opposite to the direction of rotation of, the cylinder 20 is a helix member or auger 55 comprising a substantially continuous helix of relatively thin metal 55a secured to and surrounding a central vertical tube 56. Secured to the lower end of the tube is a shaft 57 which extends through a bearing 58 between it and the shaft 22, the shaft 57 extending completely through the hollow shaft 22 and being supported at the lower end by a thrust bearing (not shown). Drive means are provided for rotating the shaft 57 and the helix member in the direction of the arrow of FIGURE 3, and as shown in the drawings, these means may include a motor 60 mounted on the framework, the motor shaft 61 carrying a pulley 62 connected by means of belts 63 to a pulley 64 keyed to the lower end of the shaft 57. The knife cylinder 20 and the helix member 55 rotate in opposite directions at different speeds. Good results have been obtained with a speed of 750 r.p.m. for the cylinder 20 and 350 r.p.m. for the helix member.

The upper end of the tube 56 is open and the lower end is provided with an end wall 70. A lateral opening 71 in the tube is provided immediately above the walls 70, and a curved fruit guide plate 72 leads from the inside of the tube downwardly to the lower portion of the opening. An annular shield plate 73 is preferably provided on the lower end of the tube 56. The tube is centered at the top by means of a ring element 75 secured to a beam 76 carried on the framework.

Preferably, means are provided for assuring that the fruit is rolled or turned as it is conveyed through the apparatus by the helix member, and as shown, these means may include a plurality of raised half-rod elements 80 positioned on the upper surface of the helix 55a and extending radially thereacross. Preferably, means are also provided for assisting the centrifugal force tending to urge the fruit outwardly against the knife edges, and as shown in the drawings, these means may include a plurality of generally semi-circular, flexible paddle elements 87 secured to the tube 56, the elements 87 each preferably being provided with a plurality of forwardly-directed, flexible finger members 88. A vertical member 89 is interposed between the bottom flights of the helix member to prevent fruit from rolling off the flights.

Figure 4:
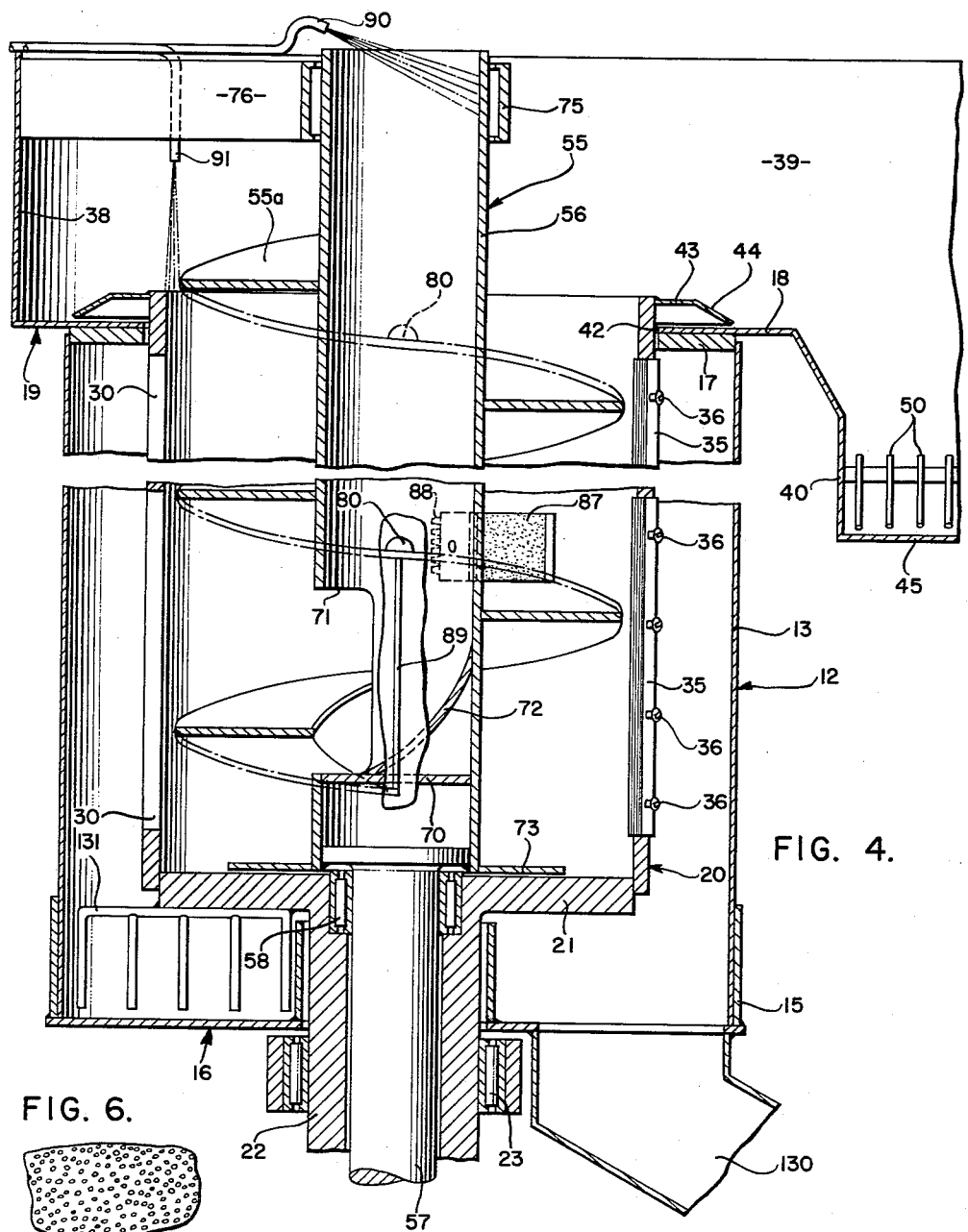
FIGURE 4 is a sectional elevation taken substantially on the line 4—4 of FIGURE 3.
Figure 6:
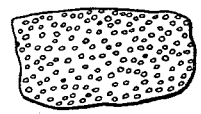

Water lubrication and spray means are provided at various points in the apparatus. Thus, a water spray tube 90 directs a jet of water into the open upper end of the tube 56 at an angle as shown best in FIGURE 4. A stream of water is delivered downwardly into the cylinder 20 by means of a water outlet 91, and one or more water spray nozzles 92 are provided in the exit portion of the pan.

The fruit or other articles to be operated upon are fed into the open upper end of the tube 56 by any convenient means, such as by gravity feed from the end of the conveyor 100. A curved guide plate 101, preferably lined or coated with a material such as "Teflon" to provide a slipping surface, is preferably provided adjacent the end of the conveyor to direct the fruit into the tube.

In operation of the apparatus thus described, articles such as lemons are fed from the conveyor 100 into the open upper end of the tube 56, also preferably lined or coated with "Teflon," through which they fall by gravity, emerging therefrom through the openings 71 and into contact with the helix 55a. The lemons are thereby conveyed upwardly through the space between the tube 55 and the cylinder 20, the centrifugal force of the paddle elements functioning to force the lemons outwardly into contact with the rotating knife blades 35. The raised elements 80 intermittently contact the fruit while it is being contacted by the rotating knife blades 35, to jar the fruit and to assist in continuously changing its axis of revolution so that all surfaces are presented to the knife blades.

Figure 5:
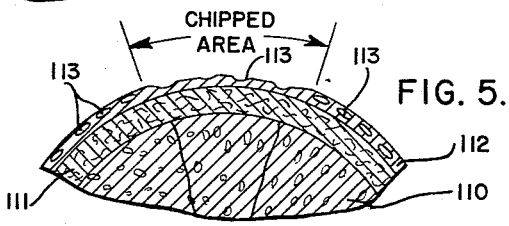
FIGURE 5 is a fragmentary sectional view of a portion of a citrus fruit partially operated upon by the apparatus of the present invention.

Preferably, the rate of feed of fruit to the apparatus is maintained sufficiently high so as to keep the entire apparatus, and particularly the annulus between the tube 56 and the cylinder 20, full of fruit so that the fruit are in mutual contact at all times. The friction thus created between the adjacent fruit tends to limit the speed of rotation of the fruit and to prevent rotation of the individual fruit at the same lineal speed as the cylinder 20. In this manner, by the time the fruit has travelled upwardly to the top of the cylinder 20, substantially all portions of the surface thereof come into contact with the knife blades which, in the case of citrus fruits, cut into the oil-bearing flavedo layer of the peel or skin, cutting or chipping away all, or a portion of the flavedo layer, depending upon the setting of the knife blades. The portions of the peel thus removed are in the form of relatively thin, discrete flakes of the peel. In use of the apparatus for recovery of citrus oils such as lemon oil, it is preferred to cut into the approximate center of the flavedo, the removed flakes having a lice-like appearance due to the bisecting or opening of the oil sacs. Thus, a portion of a partially chipped lemon 110 is diagrammatically illustrated in FIGURE 5, the peel comprising the inner albedo layer 111 and the outer flavedo layer 112. It would be noted that in the chipped area the oil sacs 113 of the flavedo are opened and exposed in such a manner to release the oil contained therein without the necessity of any pressing operation.

Figure 2:
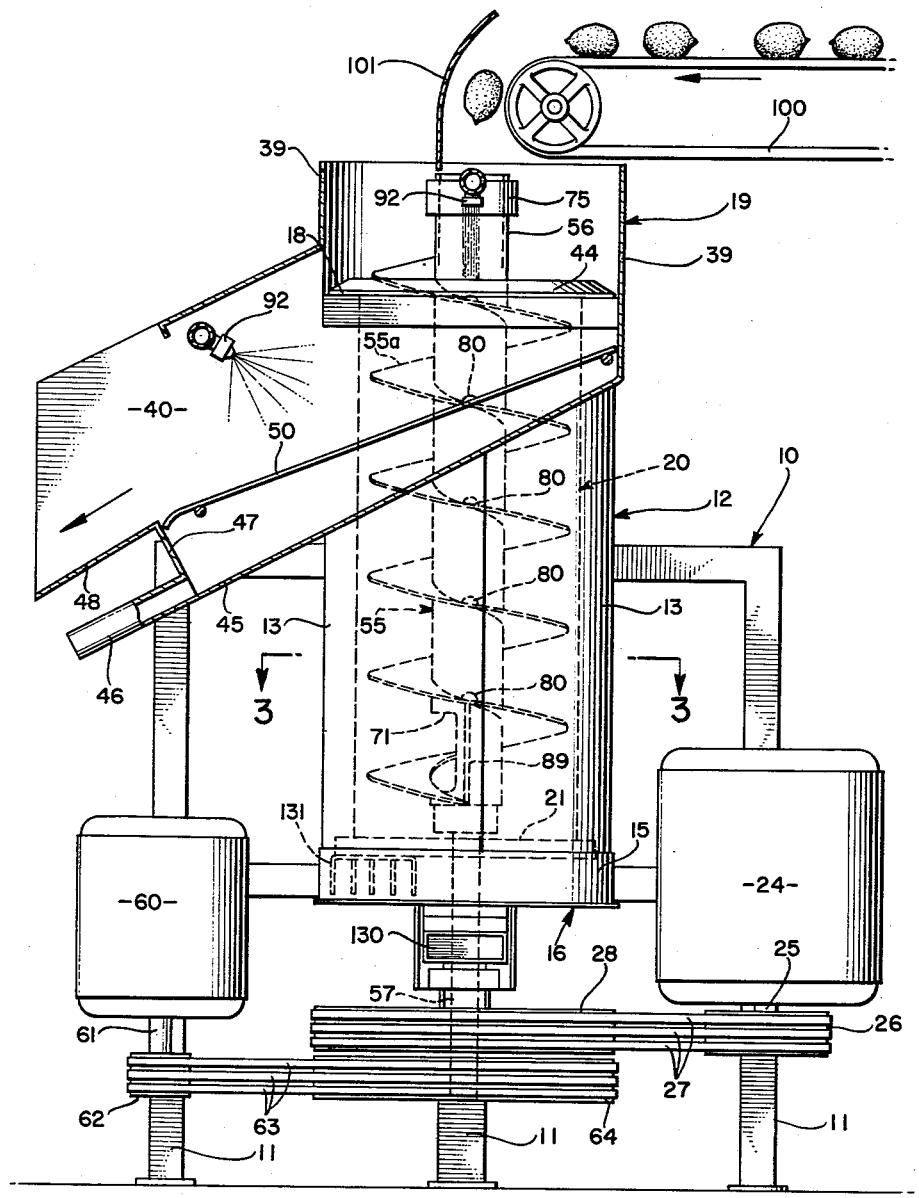
FIGURE 2 is a sectional elevation taken substantially on the line 2—2 of FIGURE 1.

Upon arriving at the upper open end of the cylinder 20 the fruit, now essentially denuded of the outermost portion of the skin, is forced outwardly by centrifugal force over the flange member 43 and then downwardly across the grid wires 50 in the direction of the arrow of FIGURE 2. Most desirably, the denuded fruit is washed for additional oil recovery and then fed directly to a juice extracting machine. In the case of grapefruit and oranges which are to be processed into fruit sections for canning, the chipped whole fruit is preferably fed to a hot water bath for softening of the peel to facilitate the peeling operation prior to sectioning.

The chips or flakes of removed peel are forced outwardly through slots 30, whereupon they fall downwardly into the bottom of the housing to be discharged through the outlet 130. In order to prevent accumulation of the flakes in the housing bottom, a rake member 131 is secured to the cylinder bottom wall 21 and rotates with the cylinder to continuously sweep the flakes ahead of it into the outlet.

The wash and lubrication water from the spray tubes, outlets and nozzles 90, 91 and 92 is continuously applied during the operation so that as oil is released from the oil sac by the operation of the knife blades, at least some of the volatile constituents thereof are condensed and the relatively non-volatile constituents are washed from the fruit, a portion of the oil constituents thus being emulsified in the water. The water also functions to keep the knife slots clean and tends to wash the chips therethrough, the water and chips being thrown outwardly, the cylinder 20 functioning in the manner of a centrifugal pump. Means (not shown) may be provided to refrigerate the water to a low temperature to assist in capturing even the very volatile oil fractions. The major portion of the oil and emulsion discharges through the slots 30 and is discharged along with the flakes through the outlet 130. The nozzle 92 washes free oil from the surface of the chipped whole fruit. This oil, a portion of which is emulsified, discharges through the pipe 46. The emulsion and free oil is separated from the flavedo chips as by decantation, combined with the emulsion and oil from the outlet 46, the free oil settles out as clear oil and is separated as such, and the emulsion is centrifuged or otherwise treated to separate the valuable emulsified citrus oil from the water. The flakes are washed with fresh water and the washings also centrifuged, either separately or combined with the above-mentioned mixture. Other means for separation of the water and oil from the chips may be utilized, such as for example with use of a citrus juice finisher, centrifugal screen and the like, preferably under conditions as to reduce the chips to a state of virtual dryness.

The apparatus of the present invention is particularly advantageous in the application thereof to the recovery of citrus oil in that in operation of the apparatus the oil is released with a minimum of maceration and virtually no pressure upon the peel, resulting in a citrus oil of excellent color without the inclusion of undesirable contaminants, waxes and the like which would ordinarily be present if the peel were subjected to the usual pressure and/or abrading operations. The apparatus is particularly adapted to high speed operation, the apparatus specifically shown and described above being capable of, for example, operating upon in the neighborhood of 1,200 lemons per minute.

The apparatus and method of this invention lends itself well to integrated citrus plant operations in that high yields of citrus oil of excellent quality are obtained from whole fruit, leaving the fruit in a clean, sanitary condition for the juice extracting operation. Additionally, the structure of the apparatus is such that it is easily modified to recover even the extremely low-boiling essence flavor constituents of the boil which are released during the operation. Thus the machine can be hermetically sealed and the housing can be readily jacketed for operation under conditions of refrigeration. The high speed rotation of the knife blades causes them to function somewhat in the manner of a blower producing a condition of reduced air pressure in the tube 56, thus tending to prevent escape of the volatile flavor essence vapors through the tube. Such vapors tend to be discharged with the emulsion and peel flakes at which points they can be recovered by convenient means.

The apparatus of the present invention is not limited to operation upon citrus fruit but can be used for peeling fruits and vegetables generally and is easily adapted, for example, to the reduction of onions to chip or flake form for use in the production of soups and the like, to the peeling of peaches, to the chipping or disintegration of pineapple stems or roots, and the like. It will be understood to those skilled in the art that the width of the slots 30 can be varied in accordance with the type of material being processed. For example, in processing pineapple stems, roots or stumps, the slots 30 should be increased in width to obtain the desired chipping action and to provide an ample exit for the tough, fibrous material being removed. Similarly, the cutting edges of the knives 35 can be modified, depending upon the material being processed. Thus, the single bevel cutting edge shown in the drawings may be used, or if desired a double bevel cutting edge may be utilized. Further with respect to the processing of pineapple stumps and the like, it is preferred to dispense with the elements 80 which would interfere with the desired presentation of the cylindrical portions of the stumps to the knives.

While the apparatus is preferably mounted vertically as shown and described, it will be understood that if desired the center line may be inclined at an angle from the vertical. Moreover, it is possible and in fact desirable for certain applications to rotate the cylinder 20 and the helix member 55 in the same relative directions, but in all cases the helix is rotated so as to convey the articles upwardly as described.

Having fully described our invention, it is to be understood that we do not wish to be limited to the details set forth, but our invention is of the full scope of the appended claims.

We claim:

1. Apparatus for removal of chips from articles, comprising the combination of a housing, a cylinder mounted for rotation in said housing, said cylinder being provided with a longitudinal knife blade having a cutting edge extending inwardly of said cylinder and pointing generally in the direction of rotation of said cylinder, said cylinder being closed at the bottom and open at the top, a tube mounted coaxially within said cylinder for rotation with respect to said housing, said tube being open at the top and having a lateral opening adjacent the lower portion thereof, a helix element surrounding and carried by said tube, means for rotating said cylinder, the direction of rotation of said helix being such as to convey articles upwardly through said cylinder whereby the articles contact said knife blade for removal of chips from the articles, means for collection and recovery of said chips, and means for discharging the articles from the upper portion of said housing.

2. Apparatus for treating removal of chips from articles, comprising the combination of a housing, a cylinder mounted for rotation in said housing, said cylinder being provided with a plurality of longitudinal knife blades having cutting edges extending inwardly of said cylinder and pointing generally in the direction of rotation of said cylinder, said cylinder being closed at the bottom and open at the top, a tube mounted coaxially within said cylinder for rotation with respect to said housing, said tube being open at the top and having lateral opening adjacent the lower portion thereof, a helix element surrounding and carried by said tube, means for feeding articles to be treated to the open upper end of said tube whereby they fall by gravity downwardly through said tube and are discharged through said lateral opening into contact with said helix, means for rotating said cylinder and said helix element, the direction of rotation of said helix being such as to convey articles upwardly through said cylinder whereby the articles contact said knife blades for removal of chips from the articles, means for collection and recovery of said chips, and means for discharging the articles from the upper portion of said housing.

3. Apparatus for treating citrus fruit and the like comprising the combination of a housing, a cylinder mounted vertically for rotation in said housing, said cylinder being provided with a longitudinal knife blade having a cutting edge extending inwardly of said cylinder and pointing generally in the direction of rotation of said cylinder, said cylinder being closed at the bottom and open at the top, a tube mounted coaxially within said cylinder for rotation with respect to said housing, said tube being open at the top and having a lateral opening adjacent the lower portion thereof, a helix element surrounding and carried by said tube, means for rotating said cylinder and said helix element in different directions, the direction of rotation of said helix being such as to convey articles upwardly through said cylinder whereby the articles contact said knife blade for removal of chips from the articles, means for applying water to said articles while in contact with said knife, means for collection and recovery of said chips and water, and means for discharging the articles from the upper portion of said housing.

4. Apparatus for treating citrus fruit, and the like comprising the combinaiton of a housing, a cylinder mounted vertically for rotation in said housing, said cylinder being provided with a longitudinal knife blade having a cutting edge extending inwardly of said cylinder and pointing generally in the direction of rotation of said cylinder, said cylinder being closed at the bottom and open at the top, a tube mounted coaxially within said cylinder for rotation with respect to said housing, said tube being open at the top and having a lateral opening adjacent the lower portion thereof, a helix element surrounding and carried by said tube, means for rotating said cylinder and said helix element in different directions, the direction of rotation of said helix being such as to convey articles upwardly through said cylinder whereby the articles contact said knife blade for removal of chips from the articles, means on said helix for changing the direction of rotation of said articles, means for collection and recovery of said chips, and means for discharging the articles from the upper portion of said housing.

5. The apparatus of claim 4 wherein said direction-changing means comprises a plurality of raised portions extending radially across the helix.

6. Apparatus for treating citrus fruit and the like comprising the combination of a housing, a cylinder mounted vertically for rotation in said housing, said cylinder being provided with a longitudinal knife blade having a cutting edge extending inwardly of said cylinder and pointing generally in the direction of rotation of said cylinder, said cylinder being closed at the bottom and open at the top, a tube mounted coaxially within said cylinder for rotation with respect to said housing, said tube being open at the top and having a lateral opening adjacent the lower portion thereof, a helix element surrounding and carried by said tube, means for rotating said cylinder and said helix element in different directions, the direction of rotation of said helix being such as to convey articles upwardly through said cylinder whereby the articles contact said knife blade for removal of chips from the articles, means operably connected to said helix for urging the articles outwardly into contact with said knife blade, means for collection and recovery of said chips, and means for discharging the articles from the upper portion of said housing.

7. The apparatus of claim 6 wherein said operably-connected means comprises a plurality of curved paddle members extending outwardly from the tube between the flights of the helix.

8. The apparatus of claim 7 wherein the paddle members are flexible and are provided with a plurality of forwardly-directed fingers on the front surfaces thereof.

9. Apparatus for treating citrus fruit and the like comprising the combination of a housing, a cylinder mounted vertically for rotation in said housing, said cylinder being provided with a plurality of longitudinal slots therein, a knife blade mounted in each slot and having a cutting edge extending inwardly of said cylinder and pointing generally in the direction of rotation of said cylinder, said cylinder being closed at the bottom and open at the top, a tube mounted coaxially within said cylinder for rotation with respect to said housing, said tube being open at the top and having a lateral opening adjacent the lower portion thereof, a helix element surrounding and carried by said tube, means for feeding articles to be treated to the open upper end of said tube whereby they fall by gravity downwardly through said tube and are discharged through said lateral opening into contact with said helix, means for rotating said cylinder and said helix element in different directions, the direction of rotation of said helix being such as to convey articles upwardly through said cylinder whereby the articles contact said knife blades for removal of chips from the articles, means for applying water to said articles while in contact with said knife, means on said helix for changing the direction of rotation of said articles, means operably-connected to said helix for urging the articles outwardly into contact with said knife blades, means for collection and recovery of said chips, and water, and means for discharging the articles from the upper portion of said housing.

10. Apparatus for treating citrus fruit and the like comprising the combination of a housing, having a bottom wall, a cylinder mounted vertically for rotation in said housing, said cylinder being provided with a plurality of longitudinal slots therein, a knife blade mounted in each slot and having a cutting edge extending inwardly of said cylinder and pointing generally in the direction of rotation of said cylinder, said cylinder being closed at the bottom and open at the top, a tube mounted coaxially within said cylinder for rotation with respect to said housing, said tube being open at the top and having a lateral opening adjacent the lower portion thereof, a helix element surrounding and carried by said tube, means for rotating said cylinder and said helix element in different directions, the direction of rotation of said helix being such as to convey articles upwardly through said cylinder whereby the articles contact said knife for removal of chips from the articles, means for applying water to said articles while in contact with said knife blades, means for collection and recovery of said chips and water, said collection and recovery means including an outlet in the housing bottom wall and a rake member carried on said cylinder and adapted to sweep chips across said bottom wall and into said outlet.

References Cited in the file of this patent

UNITED STATES PATENTS

| | | |
|---|---|---|
| 692,011 | Hansen | Jan. 28, 1902 |
| 2,354,878 | Platt | Aug. 1, 1944 |
| 2,605,798 | Boswell | Aug. 5, 1952 |
| 2,619,139 | Riggle et al. | Nov. 25, 1952 |
| 2,691,786 | Reading | Oct. 19, 1954 |